United States Patent [19]

Canay

[11] Patent Number: 4,695,939

[45] Date of Patent: Sep. 22, 1987

[54] THREE-PHASE EXCITER FOR SYNCHRONOUS MACHINES

[75] Inventor: Muzaffer Canay, Birr, Switzerland

[73] Assignee: BBC Brown, Boveri & Company, Limited, Baden, Switzerland

[21] Appl. No.: 868,059

[22] Filed: May 29, 1986

[30] Foreign Application Priority Data

Jul. 4, 1985 [CH] Switzerland .................. 2888/85

[51] Int. Cl.⁴ .................. H02J 3/01; H02K 19/00
[52] U.S. Cl. .................. 363/39; 363/47; 361/23; 361/113; 333/12; 322/58
[58] Field of Search .................. 363/39, 47, 48, 50, 363/51, 52, 53; 361/23, 31, 33, 113, 100, 111; 318/807–811; 333/172, 173, 12 R; 322/58, 59

[56] References Cited

U.S. PATENT DOCUMENTS

| | | | |
|---|---|---|---|
| 3,532,997 | 10/1970 | Faye | 333/173 X |
| 4,491,778 | 1/1985 | Knox et al. | 318/811 X |
| 4,491,903 | 1/1985 | Montague | 363/48 |
| 4,539,617 | 9/1985 | Delaney et al. | 361/113 X |

OTHER PUBLICATIONS

Albert Kloss and Jean Heinrich "Der Kafigmoto mittlerer Leistung mit I-Umrichter" pp. 163–169, (1982).
"Burstenloses Erregungssytem Rotaduct fur Synchron–generatoren und–motoren mittlerer Leistung" Erich Schneider et al., pp. 145–148 (1968).

Primary Examiner—Patrick R. Salce
Assistant Examiner—Emanuel Todd Voeltz
Attorney, Agent, or Firm—Oblon, Fisher, Spivak, McClelland & Maier

[57] ABSTRACT

A synchronous machine with alternating-current exciter, wherein the stator of the exciter machine, the rotor of which runs in the opposite direction of rotation to that of the stator field, is fed from a three-phase power controller. The voltages induced in the rotor of the alternating-current machine are rectified by diodes in a three-phase star circuit. In order to minimize the effect of the voltage peaks originating from the hole-storage effect during the commutation of the diodes, which peaks are abnormally high as a result of the mutual interaction of the harmonics, there is produced a parallel path for high-frequency currents in the form of a protection circuit having low-pass characteristic so that the mutual interaction between stator and rotor harmonics if greatly reduced. Because of the risk of self-excitation, the elements of the protection circuit are matched to the machine and cause as few additional losses as possible. To reduce the voltage peaks at the diodes sufficiently and, at the same time, also keep the losses within acceptable limits, a reactor is connected in series after the three-phase power controller.

11 Claims, 1 Drawing Figure

U.S. Patent  Sep. 22, 1987  4,695,939
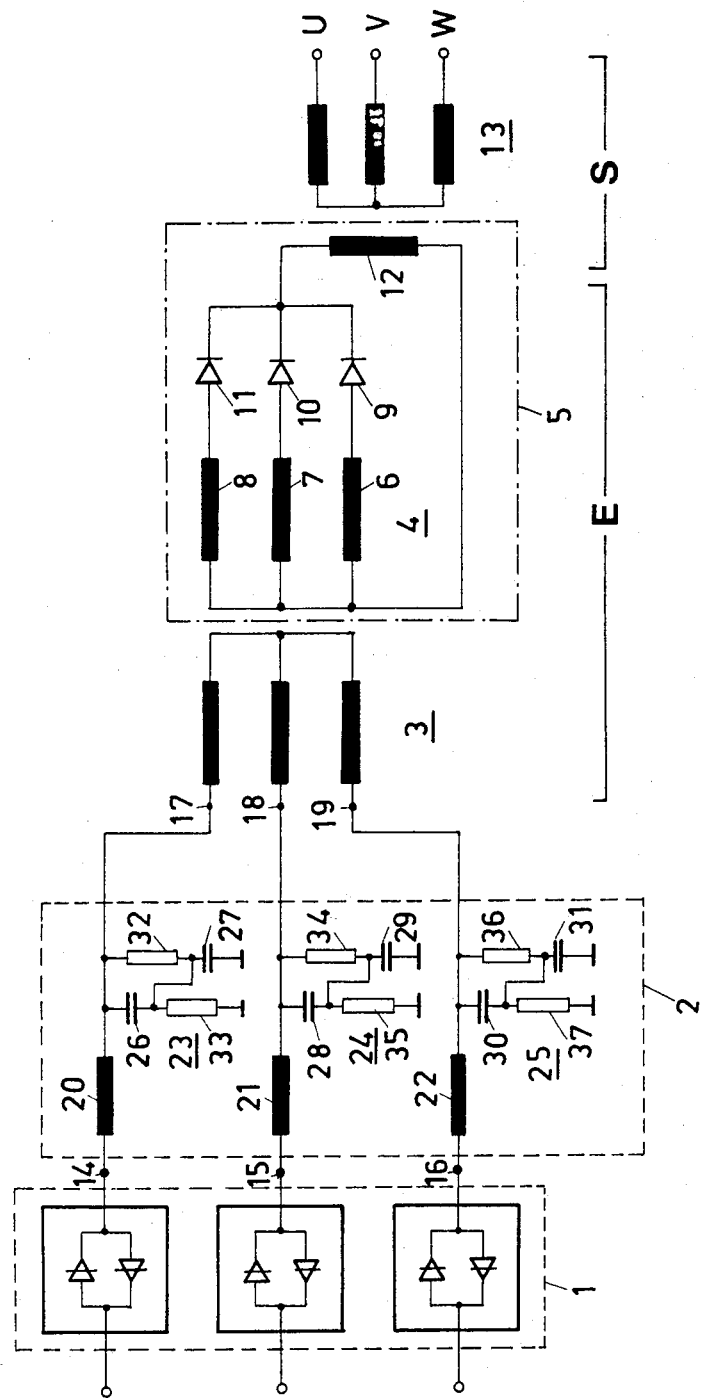

THREE-PHASE EXCITER FOR SYNCHRONOUS MACHINES

BACKGROUND OF THE INVENTION

Field of the Invention

The invention relates to a three-phase exciter for synchronous machines.

In particular, this invention relates to a three-phase exciter of the type which can be seen, for example, from the German journal "Techn. Mitt. AEG-TELEFUNKEN" (AEG Telefunken Technical Information) 58(1968)3, page 145–148, "Brushless excitation system . . . ", particularly FIG. 2.3.

DISCUSSION OF THE BACKGROUND

Exciter arrangements for synchronous machines without sliprings and brushes are advantageous wherever maintenance-free operation has a particularly high value or the transmission of current with the aid of sliding contacts presents fundamental difficulties. A known solution of the brushless synchronous machine with a three-phase exciter generator and rotating semiconductor components is the construction described in the aforementioned publication.

In this case, the shaft of the main internal-field machine carries, on the one hand, the rotor of this main machine and, on the other hand, the rotor of the exciter machine which is constructed as a stationary-field machine and the three-phase armature winding of which works into a star-connected three-phase rectifier arrangement with ungated semi-conductors (FIGS. 1 and 2.3 loc.cit.). Alternatively, the three-phase rectifier arrangement can be constructed in a bridge circuit (FIGS. 1 and 2.1 loc. cit.).

The three-phase star connection is more advantageous where exciter voltages are needed in cases where the permissible reverse voltages of the diodes cannot be utilized. Compared with the bridge circuit, the expenditure in rectifiers is halved and, moreover all diodes can be mounted on a common heat sink.

However, these savings in rectifiers are achieved at the cost of greater copper expenditure in the armature winding of the exciter machine as a result of the less advantageous ratio between the direct current and the root mean square value of the phase current in the star circuit. The greater ripple of the direct voltage in the star circuit is without significance given the large inductance of the exciter winding of the main machine. The protective resistance in parallel with the rotor winding has here been divided up and connected in parallel with the individual rectifier branches. This makes it unnecessary to install capacitors for suppressing the commutating voltage at the diodes.

As a rule, the aforementioned protective measures are quite sufficient for keeping the commutating voltage peaks within tolerable limits when the three-phase exciter machine is fed from a voltage source or a voltage-controlled converter, a so-called U-converter. However, if it is fed by an alternating-current power controller which, with the same rating, is much more cost-effective, much higher commutating voltage peaks occur. These are up to five times higher as a consequence of the mutual interaction of the harmonics and particularly in the case of machines in which the stator of the three-phase exciter machine is fed in the direction of rotation opposite to the direction of rotation of the rotor, and they can only be controlled by very elaborate diode circuits in the rotor.

As is known, there are two types of voltages which act on semi-conductor diodes.

(1) Hole storage effect:

These voltages occur when the very small reverse current of a few mA breaks off again after the zero transition of the current. The sharp voltage peak produced during this process is a function of the diode itself and of the commutating inductance of the circuit and becomes greater with increasing operating temperature, on-state current and commutating inductance of the circuit. With a given circuit with fixed inductance and constant on-state current (without strong harmonics), the same di/dt and equal voltage peaks always occur when the reverse current breaks off.

To reduce these voltage peaks, it is known to protect the diodes with circuits of R and C sections.

But as long as these voltage peaks are below the reverse voltage limit of the diodes and the permissible break-down voltage of the winding, they are harmless. There are machines (without diode protection circuits) which have hitherto not given cause for complaints.

(2) Voltage peaks due to transformer transmission between stator and rotor:

In the stationary state, a fundamental-frequency voltage corresponding to the existing air gap field is produced in the rotor. But if the operation of the three-phase power controller is imagined as the switching-on of a voltage of, for example, 380 volts in brief time intervals, the peak value of this transformer voltage can rise to far above 1000 volts in this case.

However, both effects together are not sufficient to endanger the diodes having a reverse voltage of 2.4-kVolt. This is because the following anomalies occur:

the commutating process of a diode does not take place in the same form in each period;

the duration of a period (time between successive comutating processes) does not exactly correspond to the rotational speed;

the voltage peaks occur with different magnitudes and the maximum values, seen in their entirety, are up to five times greater than without three-phase power controller.

These anomalies cannot be explained even by the hole storage effect and "voltage peaks".

In this connection, it must also be noted that the analogy between operation of the three-phase power controller and a sudden switch-on is not entirely appropriate.

Extensive tests have unambiguously confirmed that the cause of the anomaly lies in the mutual interaction between the three-phase power controller and the star connection. A three-phase power controller and a bridge circuit with low harmonics or only a star circuit without the three-phase power controller do not generate such high voltage peaks and especially no irregularities in commutation, even though the hole storage effect and the transformer transmission process are fully present.

Mathematically expressed, this mutual interaction takes place by means of impressed current harmonics which are amply generated both by the star circuit and by the three-phase power controller. Thus, the three-phase power controller and the star circuit in the rotor are not very compatible.

In the case of machines with a variable rotational speed of up to 6000 rpm and higher, the construction of the known RC circuit technique presents constructional difficulties with respect to accommodation, support and cabling of the components which, in their entirety, increase the constructional length of the entire machine.

SUMMARY OF THE INVENTION

Accordingly, one object of this invention is to provide a novel alternating-current exciter of the generic type initially mentioned, which features a short constructional length and a comparatively constructionally modest expenditure in protective circuitry for the semiconductor components of the exciter rectifier.

Whereas the measures for protecting the semi-conductors up until then were restricted to their immediate vicinity, that is to say to the rotor, and there to the so-called rotating rectifier assembly, the present invention provides a more unconventional but more successful way, namely of arranging the "protection circuit" on the stator side. Its fundamental idea consists in providing a parallel path for high-frequency currents already in or before the stator so that the mutual interaction of the stator and rotor harmonics is greatly reduced. As a result, the hole storage effect voltage peaks return to their normal value. In accordance with the invention, the connecting path between three-phase power controller and stator of the exciter machine has a low-pass character, with the result that only useful currents can flow along it but the high-frequency currents to and from the machine are by-passed.

The invention is particularly suitable for synchronous machines with adjustable rotational speed from zero to 6000 rpm and higher. In such a machine, a three-phase power controller with a variable amplitude of its output current feeds the stator of a three-phase exciter machine the rotor of which runs in the opposite direction of rotation to the rotating stator field to enable the main machine to be already excited in its standstill condition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, which is a schematic block diagram of the three-phase exciter of the invention.

In the drawing, which illustrates an illustrative embodiment of the invention, a three-phase power controller 1 with adjustable current amplitude feeds, via a protection circuit 2 with low-pass characteristic, the stator winding 3 of a three-phase exciter machine E the three-phase rotor winding of which is designated by 4 and the rotor of which is designated by 5. Rectifier diodes 9, 10, 11, which are connected together at their cathodes, are connected in series with each phase winding 6, 7, 8. The free ends of the phase windings 6, 7, 8 are also connected together. The exciter winding 12 of the main machine S, the three-phase stator winding of which is designated by 13, is connected in parallel with this circuit arrangement which represents a three-phase rectifier star connection.

The three-phase power controller (I-inverter) 1 is a known device which is used for feeding variable-speed drives, particularly asynchronous machine drives and the construction and operation of which is shown, for example, in the journal "Brown Boveri Review" 4/5-82, page 168, FIG. 7.

The protection circuit 2, which is in three-phase construction and the construction and operation of which is described in the text below, is connected between the output terminals 14, 15, 16 of the three-phase power controller 1 and the stator terminals 17, 18 and 19 of the three-phase exciter machine E.

A reactor 20, 21, 22 is in each case connected in series with the terminals 14, 15, 16. Between the connecting line from the reactors 20, 21 and 22 at stator terminals 17, 18 and 20 and ground, an RC combination 23, 24 and 25 is connected in each case which, in the case of the example, consists of two capacitors 26 to 31 and resistive impedances 32 to 37 in each case. The parallel circuits of the resistors 32, 34, 36 and the capacitors 26, 28 and 30 are in each case connected in series with the parallel circuits of the resistors 33, 35 and 37 and the capacitors 27, 29 and 31.

Thus, each connection between the terminals 14 and 17, 15 and 18 and 16 and 19 has a low-pass characteristic.

Because of the risk of self-excitation, the values of the capacitors and resistors of the protective circuit 2 must be matched to the three-phase exciter machine and particularly the resistance values must be selected in such a manner that they cause as few additional losses as possible.

In this arrangement, the reactors 20, 21, 22 have the task primarily of reducing voltage peaks in the rectifier diodes 9, 10, 11 and, at the same time, also of keeping the losses within tolerable limits, and can be omitted if necessary.

Possible variants of RC combinations 23, 24, 25 consist in (a) either omitting the components 32 and 27, 34 and 29, 36 and 31, that is to say the RC combination now only comprises the series circuit of a capacitor with a resistive impedance (b) or omitting in each case resistors 32, 34 and 36 (connecting a capacitor in series with the parallel circuit of a capacitor and a resistive impedance)

(c) or omitting one of the two parallel circuits of resistor and capacitor of the series circuit: each RC combination then only comprises the parallel circuit of one capacitor and one resistor, for example 27 and 33, 29 and 35, 31 and 37.

The operation of the protection circuit according to the invention is explained in greater detail in the text which follows.

In addition to the fundamental wave of mains frequency (50 or 60 Hz), the three-phase power controller acting as current source also generates impressed current harmonics with the odd ordinal numbers −5, 7, −11, 13, −17 and so forth. The stator current harmonics and so forth, generated by the rotor harmonics as a consequence of the star connection, can therefore no longer flow in the stator. Similarly, the currents corresponding to the stator harmonics can no longer flow in the rotor. Expressed in other words, this means that the stator acts like an open circuit for the rotor harmonics and the rotor acts like an open circuit for the stator harmonics. As a consequence, all impressed current harmonics flow through the main inductance of the machine and generate higher voltages and higher voltage peaks. In this connection, it must also be noted that, in conjunction with the stator acting like an open circuit, the commutating inductance is also increased for the diodes in the rotor. Both effects lead to destruction of the diode if suitable protective measures are not taken. As initially demonstrated, the possibility basically exists of protecting the semi-conductor components by using rectifier diodes of extremely excessive dimensions, if necessary in combination with diode protection circuits which are directly associated with the diodes, that is to say accommodated on the rotor in the so-called rotating rectifier assembly. This leads to considerable constructional difficulties particularly in the case of high-speed rotors.

However, the idea and conception of the construction and circuit of the invention takes a completely different approach which consists in allocating the protection circuit to the stator of the three-phase exciter machine and generating a parallel path for high-frequency currents already in the stator of the exciter machine so that the mutual interaction of the stator and of the rotor harmonics is greatly reduced.

From the above explanations it is clear that the protection circuit according to the invention must be matched to the respective three-phase power controller/three-phase exciter machine systems.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A three-phase exciter for synchronous machines having a brushless excitation system, comprising:
   a three-phase exciter machine having a rotor including a multi-phase rotor winding including plural phase windings, and a stator having a stator winding;
   a rectifier star circuit located on said rotor and connected to said rotor phase windings;
   a synchronous machine including an exciter winding which is fed by said rectifier star circuit;
   a three-phase source for feeding power to said three-phase exciter machine, including a three-phase power controller having a three-phase input connected to a three-phase power source, and a three-phase output for feeding a three-phase output current; and
   a protection circuit having a low-pass characteristic connected between the three-phase output of said power controller and said stator winding of the three-phase exciter machine for protecting said rectifier star circuit, said protection circuit bypassing high frequency currents developed in said three-phase source and said stator of the exciting machine in order to reduce interaction between stator and rotor harmonics.

2. A three-phase exciter according to claim 1, comprising:
   means for adjusting the amplitude of the three-phase output current of said three-phase power controller.

3. A three-phase exciter according to claims 1 or 2, wherein said protection circuit for each phase comprises:
   a circuit including at least one resistor and at least one capacitor connected between the lines between the three-phase power controller output and stator terminals of the three-phase exciter machine and ground potential.

4. A three-phase exciter according to claim 3, wherein said protection circuit comprises:
   a series circuit of a first resistor and a first capacitor.

5. A three-phase exciter according to claim 4, wherein said protection circuit further comprises:
   a series circuit of a second capacitor and a second resistor, where an interconnection between the first resistor and the first capacitor is connected to an interconnection between the second resistor and the second capacitor.

6. A three-phase exciter according to claim 3, wherein said protection circuit comprises:
   parallel combinations each including a resistor and a capacitor.

7. A three-phase exciter according to claim 3, wherein said protection circuit comprises:
   series reactors connected between the three-phase power controller output and the circuit including the resistor and the capacitor.

8. A three-phase exciter according to claim 4, wherein said protection circuit comprises:
   series reactors connected between the three-phase power controller output and said first resistor and said first capacitor.

9. A three-phase exciter according to claim 5, wherein said protection circuit comprises:
   series reactors connected between the three-phase power controller output and the first capacitor, first resistor, second capacitor, and second resistor.

10. A three-phase exciter according to claim 6, wherein said protection circuit comprises:
    series reactors connected between the three-phase power controller output and the parallel combinations.

11. A three-phase exciter according to claim 1, comprising:
    means for feeding the stator of the three phase exciter machine in a direction of rotation opposite the direction of rotation of the rotor.

* * * * *